United States Patent [19]

Johns

[11] Patent Number: 5,484,559
[45] Date of Patent: Jan. 16, 1996

[54] APPARATUS AND PROCESS FOR MANUFACTURING BALLS MADE OF A CERAMIC MATERIAL

[75] Inventor: Herbert L. Johns, Madison, Ohio

[73] Assignee: Zircoa Inc., Solon, Ohio

[21] Appl. No.: 227,329

[22] Filed: Apr. 14, 1994

[51] Int. Cl.$^6$ ............................................. B29B 9/10
[52] U.S. Cl. .................... 264/9; 264/13; 425/6; 425/10
[58] Field of Search ................... 264/9, 13; 425/6, 425/10

[56] References Cited

U.S. PATENT DOCUMENTS

| | | | |
|---|---|---|---|
| 2,379,816 | 7/1945 | Mabbs | 425/6 |
| 2,541,165 | 2/1951 | Kulp | 264/13 |
| 2,790,201 | 4/1957 | Eilbracht et al. | 425/6 |
| 2,963,821 | 12/1960 | Baker | 425/6 |
| 3,331,898 | 7/1967 | Haas et al. | 425/10 |
| 3,457,335 | 7/1969 | Elliott | 264/13 |
| 3,702,748 | 11/1972 | Storb et al. | 425/6 |
| 4,056,340 | 11/1977 | Yalkowsky | 425/10 |
| 4,154,379 | 5/1979 | Shermutzki | 264/13 |
| 4,621,936 | 11/1986 | Hansson et al. | |

FOREIGN PATENT DOCUMENTS 756202  12/1933  France ........................... 425/10

*Primary Examiner*—Mary Lynn Theisen
*Attorney, Agent, or Firm*—Wenderoth, Lind & Ponack

[57] ABSTRACT

A fluent ceramic material is provided under pressure to a plurality of piston and cylinder devices for the purpose of dispensing drops to form balls of ceramic material. The piston and cylinder devices are each provided with a nozzle positioned above a droplet catch basin containing an aqueous gelatinizing solution. A cam mechanism controls the stroke of a piston in each cylinder so that a specific amount of the fluent ceramic material from the storage tank is dispensed in drops from the nozzles into the droplet catch basin. The use of the cam mechanism ensures the dispensing of a specific amount of material from the nozzle corresponding to a desired diameter of the resulting ceramic material ball. The desired diameter can be easily changed by appropriately changing a cam disk of the cam mechanism. The rate of production can be appropriately increased or decreased by increasing or decreasing the cyclic rate of the pistons.

26 Claims, 1 Drawing Sheet

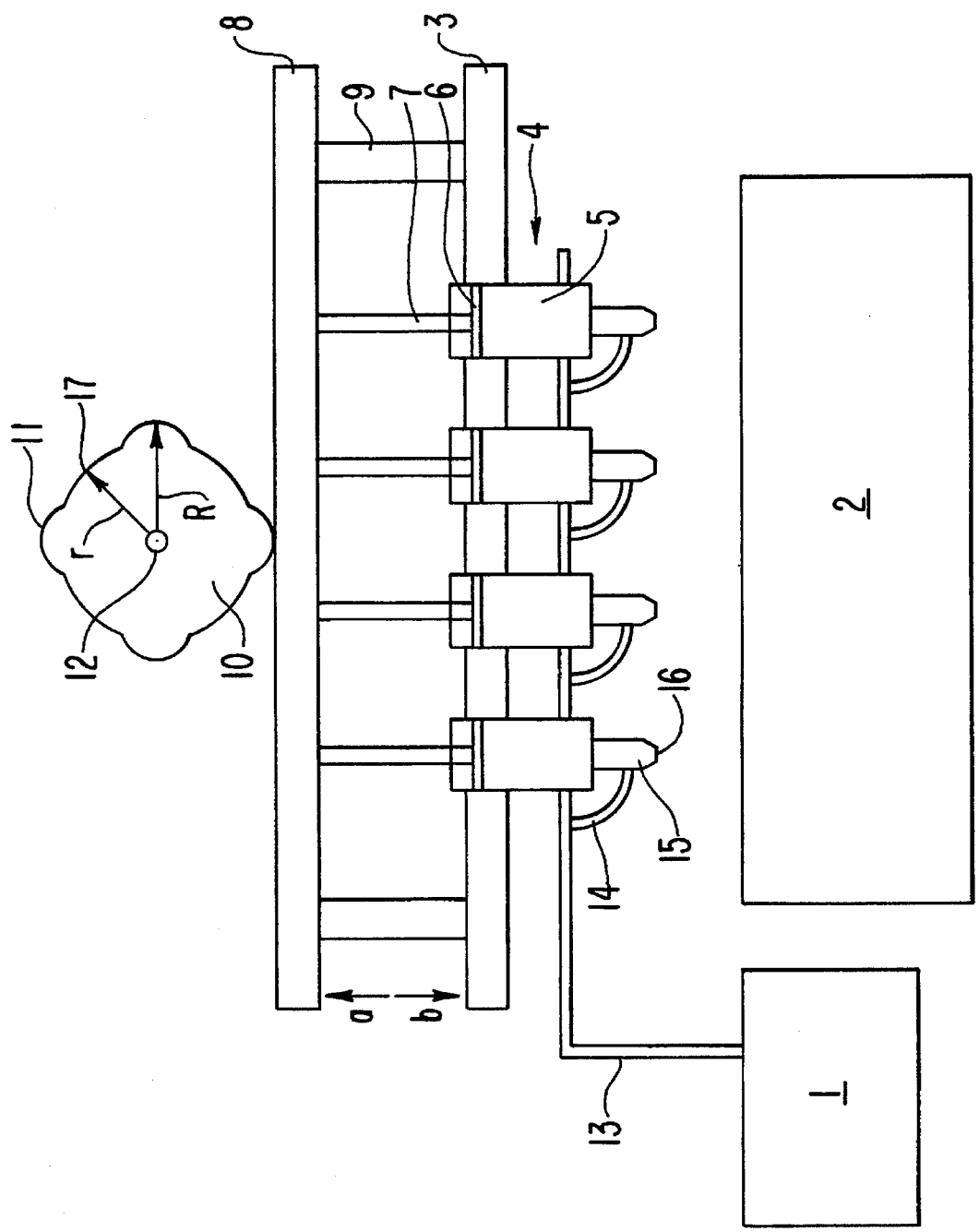

APPARATUS AND PROCESS FOR MANUFACTURING BALLS MADE OF A CERAMIC MATERIAL

BACKGROUND OF THE INVENTION

1. Field of the Invention

The present invention relates to a process for manufacturing balls made of a ceramic material. The present invention further relates to an apparatus for implementing the process of manufacturing the balls of the ceramic material. The balls produced are suitable for use in ballpoint pens, for example.

2. State of the Prior Art

A process for manufacturing balls made of a ceramic material is described in U.S. Pat. No. 4,621,936, which patent is incorporated herein by reference. A fluent ceramic material is conveyed in a free-flowing state as a slip from a slip storage tank to at least one nozzle. The material issues from the nozzle drop-by-drop into a gelatinizing solution, in which solution the material sinks while gelatinizing. In this patent, the ball diameter capable of being manufactured in the process is a function of the diameter of the nozzle. In order to achieve different ball diameters, the nozzles have to be changed. This is time consuming. In addition, only ball diameters below 3.5 millimeters can be achieved with the drip method set forth in U.S. Pat. No. 4,621,936.

Balls of a larger diameter can be manufactured in a known molding process. However, balls manufactured in the known molding process are less round than balls manufactured using the drip method. Therefore the molded balls have to be reground if exacting requirements are placed on their roundness.

In both the drip method and in the molding process, a number of balls are usually shaped at the same time. However, in both methods, the rate of production is limited. In the drip method according to U.S. Pat. No. 4,621,936, the drip rate cannot simply be raised, as the drip rate also has an effect on the ball diameter. In the molding process, the rate of production is limited by the sequence of steps involved in the molding operation.

SUMMARY OF THE INVENTION

In view of the problems in the prior art recognized by the present inventor, it is an object of the present invention to provide a process and an apparatus for manufacturing balls made of ceramic material wherein the diameter of the balls can be selected in a simple manner, and a high degree of roundness of the balls is achieved. It is a further object of the present invention to provide a process and apparatus for manufacturing balls made of a ceramic material in which the rate of production can be increased or decreased in a simple manner.

The above objects are achieved by the present invention by a process of manufacturing balls of a ceramic material in which a fluent ceramic material is conveyed from a storage tank to at least one nozzle that is connected to a cylinder having a piston therein. A drop of the fluent ceramic material is dispensed from the nozzle by moving the piston a stroke length corresponding to an amount of material that matches a desired ball diameter. The drop of fluent ceramic material is received in a gelatinizing solution, and the ball will then sink in the solution and gelatinize.

The process according to the present invention preferably employs a cam disk that engages a drive BAR connected to a piston rod of the piston. The piston is then moved over its stroke length by rotating the cam disk.

In a further preferred feature according to the process of the present invention, continuous rotation of the cam disk at a first speed will dispense a plurality of drops of the fluid ceramic material at a first rate. The speed of rotation of the cam disk can be changed from the first speed to a second speed, thus changing the rate of dispensing of the drops of the fluid ceramic material to a second rate.

According to another preferred feature of the process according to the present invention, the cam disk has at least one smaller radius portion thereon and at least one larger radius portion thereon, the difference in the radii between the smaller and larger radius portions defining the stroke length of the piston. The cam disk can then be changed to a different cam disk having a different stroke length than the first cam disk, thus changing the amount of material dispensed in each drop from the nozzle to an amount matching a different desired ball diameter.

The above objects of the present invention are further achieved by an apparatus having a liquid material storage tank, a piston and cylinder device fluidly connected to the liquid material storage tank, the piston and cylinder device having a nozzle connected thereto, a catch basin below the nozzle and a drive arrangement connected to the piston and cylinder device.

The liquid material storage tank contains a fluent ceramic material, and the catch basin contains a gelatinizing solution adapted to gelatinize drops of the fluent ceramic material falling into the catch basin from the nozzle. The fluid ceramic material preferably comprises zirconium oxide, magnesium hydroxide, water and ammonium alginate. The gelatinizing solution preferably comprises calcium chloride and water. Further, the fluent ceramic material preferably has a viscosity of 940 poise, with the gelatinizing solution having a viscosity of 700 poise.

The piston and cylinder device includes a piston that is connected to a drive arrangement. The piston has a piston rod thereon, and the drive arrangement preferably comprises a cam mechanism that is connected with the piston rod. The cam mechanism, further, preferably includes a drive rod engaging the piston rod and a cam disk that engages the drive bar.

The drive bar may be biased into engagement with the cam disk. The drive arrangement further includes an electric motor that is connected with the cam disk for rotating the cam disk. The cam disk is provided with at least one smaller and larger radius portion thereon, the difference in the radii between the smaller and larger radius portions defining a stroke length of the piston. Preferably the smaller and larger diameter portions are in the form of a plurality of humps alternating with a plurality of depressions on the cam disk.

There is preferably provided a plurality of the piston and cylinder devices fluidly connected to the liquid material storage tank and with each device having a nozzle connected therewith. Each piston and cylinder device then has a respective piston with a piston rod thereon, the piston rod being engaged by the drive rod.

Each of the piston and cylinder devices is preferably supported by a common carrier, with the drive rod being biased away from the common carrier into engagement with the cam disk by compression springs provided between the drive rod and the carrier.

A pipe extends from the liquid material storage tank to the piston and cylinder devices, each of which is provided with a respective tube connecting the nozzle thereof with the pipe.

With the process and apparatus according to the present invention, balls can be manufactured of a larger diameter than can be manufactured with the known drip method of the prior art. For instance, balls can be manufactured with the process and apparatus of the present invention having a diameter between 3 millimeters and 12 millimeters.

Further, the extruded material extruded from the nozzle assumes at the nozzle, and over the drop distance to the solution, and in the solution, a spherical shape. Thus a high degree of roundness of the resulting balls is guaranteed.

With the process and apparatus according to the present invention, a high rate of production can also be achieved. As the rate depends on the rate of motion of the pressure piston, the rate can be simply increased by increasing the rate of rotation of the cam disk establishing the rate of motion of the piston.

BRIEF DESCRIPTION OF THE DRAWINGS

Further objects, features and advantages of the present invention will become apparent to those skilled in the art from the following detailed description of the invention in conjunction with the attached drawing FIGURE.

The attached drawing FIGURE is a schematic illustration of an apparatus for manufacturing balls made of a ceramic material according to the present invention.

DETAILED DESCRIPTION OF THE PREFERRED EMBODIMENT

Referring to the drawing FIGURE, a liquid material storage tank 1 contains a fluent ceramic material, also referred to as a slip of ceramic material. The slip consists essentially of zirconium oxide, magnesium hydroxide, water and ammonium alginate in approximately the following composition:

75.3% by weight zirconium oxide 2.3% by weight magnesium hydroxide 21.8% by weight water, and 0.5% by weight ammonium alginate The fluent ceramic material has a viscosity of about 940 poise. The specific quantities noted above can be adjusted appropriately according to desired changes in the characteristics of the slip. In addition, the slip may include small percentages of flocculating agents to appropriately adjust the viscosity of the slip.

Reference numeral 2 is a droplet catch basin used for receiving drops of the fluent ceramic material. The droplet catch basin 2 contains an aqueous solution of $CaCl_2$ (calcium chloride). The composition is approximately:

30% by weight calcium chloride and

70% water

The viscosity of the aqueous solution is approximately 700 poise.

A support or carrier 3 is provided so as to support a plurality of piston and cylinder devices 4. Each piston and cylinder device 4 comprises a cylinder 5 having a piston 6 therein, the piston 6 being connected with a piston rod 7 extending from an upper end of the cylinder 5. Preferably the cylinders 5 of the piston and cylinder devices 4 are fastened or connected to the carrier 3 for support of the piston and cylinder devices 4 thereon.

The upper ends of the piston rods 7 extending from the cylinders 5 are fastened or connected to a common drive bar 8. The common drive bar 8 is thus movable relative to the carrier 3 in the direction shown by arrows a and b in the figure. The drive bar 8 is biased in a direction away from the carrier 3 by compression springs 9, in the direction of arrow a.

The common drive bar 8 engages a cam disk 10. The cam disk 10 has at least one larger diameter portion having a diameter R and at least one smaller diameter portion having a diameter r. As shown in the drawing, four larger diameter portions, or humps, 11 are provided on the periphery of the cam disk, with four corresponding small diameter portions, or depressions, 17 provided between the humps 11. The cam disk 10 has an axis 12 about which the cam disk is rotatably mounted. Preferably, the cam disk is rotated by an electric motor (not shown).

The liquid material storage tank 1 has a pipeline 13 connected thereto. The pipeline 13 is connected to each of the cylinders 5 by respective tubes 14. Also, each cylinder 5 has a nozzle 15 thereon. Preferably, each tube 14 opens into the nozzle 15 of its respective cylinder 5. Further, each nozzle 15 is provided with a nozzle opening 16 above the aqueous solution and the droplet catch basin 2.

By rotation of the cam disk 10, the drive rod 8 is moved cyclicly against the force of the compression spring 9 in accordance with the humps 11 and depressions 17 on the periphery of the cam disk 10. The resulting stroke of the pistons 6 thus corresponds to the difference between the radius R at the humps 11 and the radius r at the depressions 17 of the cam disk 10.

The slip, or fluent ceramic material, from the storage tank 1 is provided under pressure in the storage tank 1, and thus is under pressure in the pipeline 13. The fluent ceramic material is thus pushed into the cylinders 5 through the respective tubes 14. With each stroke of the common drive rod 8 in the direction of the arrow b, the pistons 6 are pushed down, and individual portions of the fluent ceramic material or slip are pushed out of the nozzles 15 of the cylinders 5. Each piston and cylinder device 4 is preferably arranged with respect to its cylinder 5 and the nozzles 15 so that, upon the downstroke of the piston 6, the piston will close off the opening of the tube 14 into the nozzles 15. Thus, in the dispensing of the individual portions of the fluent ceramic material, the opening of the tube 14 is closed off by the piston to prevent additional slip or fluent ceramic material from being forced under pressure into the nozzles 15 during dispensing. These individual portions fall under gravity into the aqueous solution in the droplet catch basin 2. In so doing, the portions assume a spherical shape. The spherical drops gelatinize in the aqueous solution and sink to the bottom of the droplet catch basin 2. Upon the subsequent upstroke the opening of the tube 14 is opened by the piston 6 so additional slip for the next drop can enter the nozzle.

The gelatinization is achieved by a reaction between the $CaCl_2$ of the solution in the droplet catch basin 2 with the ammonium alginate of the slip or fluent ceramic material. The result is an insoluble outer layer of calcium alginate on the individual balls, through which outer layer water passes osmotically and results in the balls of ceramic material solidifying. The solidified balls are then subsequently withdrawn in the customary manner from the bottom of the droplet catch basin 2 and fired.

Thus, in essence, the length of stroke of the pressure pistons 6 defines the sizes or diameters of the balls that result. Further, if a smaller ball diameter is desired, a cam disk 10 is used where the difference between the radius R and the radius r is smaller. Similarly, if larger ceramic material balls are to be produced, a cam disk 10 is used where the difference between the radius R and the radius r is larger. The cam disk 10 can be changed in a simple manner in order to produce ceramic material balls having a desired diameter. Further, with the present invention balls can be produced that have a diameter between 3 millimeters and 12 millimeters, depending on the cam disk that is used.

Furthermore, the rate of production can be selected by adjusting the speed of the motor rotating the cam disk 10, or by choosing a cam disk 10 having a different number of humps 11 and depressions 17 thereon to adjust the number of strokes per unit of time. Thus, it is possible to adjust to a comparatively high rate of production in a relatively simple manner.

While the present invention has been described with respect to a preferred embodiment thereof, variations will occur to those of skill in the art. Such variations should be considered within the scope of the present invention as defined by the appended claims.

I claim:

1. A process of manufacturing balls of a ceramic material, comprising the steps of:

conveying a fluent ceramic material from a storage tank to at least one nozzle that is connected to a cylinder having a piston therein;

dispensing a drop of the fluent ceramic material from the nozzle by moving the piston stroke length corresponding to an amount of material that matches a desired ball diameter; and receiving the drop of fluent ceramic material in a gelatinizing solution;

wherein a cam disk engages a drive bar that is connected to a piston rod of the piston, and the piston is moved over the stroke length by rotating the cam disk;

and further comprising the steps of:

continuously rotating the cam disk at a first speed, thus dispensing a plurality of drops of the fluent ceramic material at a first rate; and changing the speed of rotation of the cam disk from the first speed to a second speed, thus changing the rate of dispensing of the drops of the fluent ceramic material to a second rate.

2. A process of manufacturing balls of a ceramic material, comprising the steps of:

conveying a fluent ceramic material from a storage tank to at least one nozzle that is connected to a cylinder having a piston therein;

dispensing a drop of the fluent ceramic material from the nozzle by moving the piston a stroke length corresponding to an amount of material that matches a desired ball diameter; and receiving the drop of fluent ceramic material in a gelatinizing solution;

wherein a cam disk engages a drive bar that is connected to a piston rod of the piston, and the piston is moved over the stroke length by rotating said cam disk;

wherein the cam disk has at least one smaller radius portion thereon and at least one larger radius portion thereon, the difference in the radii between the smaller and larger radius portions defining the stroke length of the piston;

and further comprising the step of changing the cam disk to a second cam disk that defines a different stroke length than the first cam disk, thus changing the amount of material to an amount matching a different desired ball diameter.

3. An apparatus comprising:

a liquid material storage tank;

a cylinder device comprising a cylindrical internal space and a nozzle connected thereto at one end of and fluidly communicating with said internal space for dispensing liquid material from said internal space, said cylinder device being fluidly connected to said liquid material storage tank for receiving a liquid material therefrom;

a piston reciprocably disposed in said internal space of said cylinder device for causing liquid material in said internal space to be dispensed in drops from said nozzle;

a catch basin located below said nozzle of said cylinder device for receiving drops of liquid material dispensed from said nozzle by said piston; and a drive means for reciprocably driving said piston in said internal space of said cylinder device toward and away from said nozzle in a predetermined piston stroke length in the internal space such that complete movement of said piston in one direction through said predetermined stroke length dispenses one droplet of liquid material and complete movement of said piston in an opposite direction through said predetermined stroke length allows said internal space to be refilled with liquid material from said liquid material storage tank for dispensing of a next droplet of liquid material, wherein the volume defined in said internal space of said cylinder device by said predetermined stroke length corresponds to the volume of a single drop of liquid material.

4. The apparatus of claim 3, wherein said piston has a piston rod thereon and said drive means comprises a cam mechanism connected with said piston rod.

5. The apparatus of claim 4, wherein said cam mechanism comprises a drive rod engaging said piston bar and a cam disk engaging said drive rod.

6. The apparatus of claim 5, wherein said drive bar is biased into engagement with said cam disk.

7. The apparatus of claim 5, wherein said drive means further comprises an electric motor connected with said cam disk for rotation thereof, and said cam disk has a plurality of humps alternating with a plurality of depressions thereon.

8. The apparatus of claim 5, and further comprising at least one additional cylinder device having a nozzle connected thereto, being fluidly connected to said liquid material storage tank and having a piston with a piston rod therein and said piston rod engaged by said drive bar.

9. The apparatus of claim 8, wherein each of said piston and cylinder devices is supported by a common carrier, and said drive bar is biased away from said carrier, into engagement with said cam disk, by compression springs between said drive bar and said carrier.

10. The apparatus of claim 5, wherein said cam disk has at least one smaller radius portion thereon and at least one larger radius portion thereon, the difference in the radii between said smaller and larger radius portions defining said predetermined stroke length of said piston.

11. The apparatus of claim 3, and further comprising at least one additional cylinder device having a nozzle connected thereto, and being fluidly connected to said liquid material storage tank, each said nozzle having a tube extending therefrom to a common pipe, and said common pipe fluidly communicating said tubes with said liquid material storage tank.

12. An apparatus comprising:

a liquid material storage tank;

a cylinder device comprising a cylindrical internal space and a nozzle connected thereto at one end of and fluidly communicating with said internal space for dispensing liquid material from said internal space, said cylinder device being fluidly connected to said liquid material storage tank for receiving a liquid material therefrom;

a piston reciprocably disposed in said internal space of said cylinder device for causing drops of liquid material in said internal space to be dispensed from said nozzle, said piston having a piston rod thereon;

a catch basin located below said nozzle of said cylinder device for receiving drops of liquid material dispensed from said nozzle by said piston; and a cam mechanisn connected with said piston rod comprising a drive bar engaging said piston rod and a cam disk engaging said drive bar, said cam disk having a plurality of humps alternating with a plurality of depressions thereon arranged so as to provide a predetermined stroke length of said piston in said cylinder, said predetermined stroke length defining a volume in said internal space corresponding to the volume of a single one of the drops to be dispensed from said nozzle, and said nozzle being fluidly connected to only said internal space and said liquid material storage tank.

13. The apparatus of claim 12, wherein said drive bar is biased into engagement with said cam disk.

14. The apparatus of claim 12, and further comprising an electric motor connected with said cam disk for rotation thereof.

15. The apparatus of claim 12, wherein a plurality of cylinder devices are provided and supported by a common carrier, and said drive bar is biased away from said carrier, into engagement with said cam disk, by compression springs between said drive rod and said carrier.

16. The apparatus of claim 12, wherein said cam disk has at least one smaller radius portion thereon and at least one larger radius portion thereon, the difference in the radii between said smaller and larger radius portions defining said predetermined stroke length of said piston.

17. A process of manufacturing balls of a ceramic material, comprising the steps of:

(a) filling a fluent ceramic material from a storage tank into at least one cylinder device comprising a cylinder with a nozzle and a piston therein by moving the piston a predetermined stroke length in the cylinder in a first direction;

(b) dispensing a drop of the fluent ceramic material from the nozzle by moving the piston the predetermined stroke length in the cylinder in a second direction opposite to the length in the cylinder in a second direction opposite to the first direction corresponding to an amount of material that matches a desired ball diameter; and (c) receiving the drop of the fluent ceramic material in a gelatinizing solution.

18. The process of claim 17, wherein a catch basin contains the gelatinizing solution, which gelatinizes the drops of the fluent ceramic material falling into the catch basin from the nozzle.

19. The process of claim 18, wherein the fluent ceramic material comprises zirconium oxide, magnesium hydroxide, water and ammonium alginate, and the gelatinizing solution comprises calcium chloride and water.

20. The process of claim 19, wherein the fluent ceramic material has a viscosity of 940 poise and said gelatinizing solution has a viscosity of 700 poise.

21. The process of claim 17, wherein said step of filling comprises having the fluent ceramic material under pressure in the storage tank and moving the piston the predetermined stroke length in the first direction.

22. The process of claim 17, wherein:

a cam disk engages a drive bar that is connected to a piston rod of the piston, and the piston is moved over the predetermined stroke length by rotating the cam disk.

23. The process of claim 22, and further comprising:

continuously rotating the cam disk at a first speed, thus dispensing a plurality of drops of the fluent ceramic material at a first rate; and changing the speed of rotation of the cam disk from the first speed to a second speed, thus changing the rate of dispensing of the drops of the fluent ceramic material to a second rate.

24. The process of claim 22, wherein the cam disk has at least one smaller radius portion thereon and at least one larger radius portion thereon, the difference in the radii between the smaller and larger radius portions defining the stroke length of the piston, and further comprising the step of changing the cam disk to a second cam disk that defines a different stroke length than the first cam disk, thus changing the amount of material to an amount matching a different desired ball diameter.

25. The process of claim 17, and further comprising repeating said steps (a)–(c) for each drop of fluent ceramic material.

26. The process of claim 17, wherein:

said step of filling comprises conveying the fluent ceramic material from the storage tank to a plurality of cylinder devices comprising nozzles connected to respective cylinders having respective pistons therein;

said step of dispensing comprises dispensing a drop of the fluent ceramic material from each of said plurality of nozzles by moving the respective pistons the predetermined stroke length in their respective cylinders toward their respective nozzles;

said step of receiving the drop of the fluent ceramic material in a gelatinizing solution comprises receiving a plurality of drops of the fluent ceramic material in the gelatinizing solution; and said step of refilling comprises refilling each of the cylinders with fluent ceramic material from the storage tank by moving the respective pistons the predetermined stroke length in a direction away from the respective nozzles.

* * * * *